(12) United States Patent
Foate et al.

(10) Patent No.: US 11,044,903 B1
(45) Date of Patent: Jun. 29, 2021

(54) HUNTING BLIND

(71) Applicants: Christopher Foate, Hortonville, WI (US); Kelly Foate, Hortonville, WI (US)

(72) Inventors: Christopher Foate, Hortonville, WI (US); Kelly Foate, Hortonville, WI (US)

( * ) Notice: Subject to any disclaimer, the term of this patent is extended or adjusted under 35 U.S.C. 154(b) by 228 days.

(21) Appl. No.: 15/904,948

(22) Filed: Feb. 26, 2018

Related U.S. Application Data

(60) Provisional application No. 62/464,087, filed on Feb. 27, 2017.

(51) Int. Cl.
*A01M 31/02* (2006.01)
*A01M 31/06* (2006.01)

(52) U.S. Cl.
CPC .......... *A01M 31/025* (2013.01); *A01M 31/06* (2013.01)

(58) Field of Classification Search
CPC ... A01M 31/025; A01M 31/06; E04H 15/001; E04H 15/26; E04H 15/28
USPC ................................................ 43/2; 135/901
See application file for complete search history.

(56) References Cited

U.S. PATENT DOCUMENTS

| | | | | |
|---|---|---|---|---|
| 2,992,503 A | * | 7/1961 | Webb | A01M 31/025 43/1 |
| 3,039,478 A | * | 6/1962 | Timmons | E04H 15/26 135/137 |
| 3,690,334 A | * | 9/1972 | Miller | A01M 31/025 135/123 |
| 3,848,352 A | * | 11/1974 | Sayles | A01M 31/025 43/1 |
| 4,086,931 A | * | 5/1978 | Hall | E04H 15/001 135/98 |
| 4,123,869 A | * | 11/1978 | Witt | A01M 31/00 428/919 |
| 4,364,193 A | * | 12/1982 | Visco | A01M 31/025 135/901 |
| 4,388,939 A | * | 6/1983 | Barton | E04H 15/001 135/138 |
| 4,449,542 A | * | 5/1984 | McSwain | A01M 31/00 135/16 |
| 4,581,837 A | * | 4/1986 | Powlus | A01M 31/025 428/16 |
| 4,794,717 A | * | 1/1989 | Horsmann | A01M 31/025 135/901 |
| 4,829,694 A | * | 5/1989 | Oasheim | A01M 31/025 135/121 |
| 5,075,999 A | * | 12/1991 | Fredericks | A01M 31/06 43/1 |
| 5,592,960 A | * | 1/1997 | Williams | E04H 15/001 135/87 |
| 5,647,159 A | * | 7/1997 | Latschaw | A01M 31/025 43/1 |

(Continued)

*Primary Examiner* — Darren W Ark
*Assistant Examiner* — Kevin M Dennis
(74) *Attorney, Agent, or Firm* — Cramer Patent & Design, PLLC; Aaron R. Cramer

(57) ABSTRACT

A hunting blind includes a dome-shaped structure made of weather-resistant material having a plurality of flaps disposed throughout the top side thereof. A plurality of ground stakes is positioned perpendicularly beneath the underside surface of the dome-shaped structure. A plurality of apertures is disposed through at least one (1) of the flaps, each capable of receiving a portion of a decoy therein.

1 Claim, 4 Drawing Sheets

(56) References Cited

U.S. PATENT DOCUMENTS

| | | | | |
|---|---|---|---|---|
| 5,787,632 | A | * | 8/1998 | Kraut ................... A01M 31/06 43/1 |
| D405,890 | S | * | 2/1999 | Latschaw ...................... D25/16 |
| 5,903,997 | A | * | 5/1999 | Jacob ................... A01M 31/06 43/1 |
| 7,047,992 | B1 | * | 5/2006 | Fluellen ............. E04H 12/2223 135/136 |
| 8,181,661 | B2 | * | 5/2012 | Livacich ............... E04H 15/001 135/115 |
| 8,342,197 | B2 | * | 1/2013 | Roman .................. E04H 15/30 135/125 |
| 8,381,749 | B1 | * | 2/2013 | Ashmore, Jr. ........ E04H 15/001 135/90 |
| 8,381,750 | B2 | * | 2/2013 | Desouches ............ E04H 15/44 135/115 |
| 8,397,738 | B2 | * | 3/2013 | Livacich ............... E04H 15/001 135/114 |
| D712,994 | S | * | 9/2014 | Larson ......................... D21/838 |
| D737,994 | S | | 9/2015 | Galloway |
| 9,303,425 | B1 | * | 4/2016 | Galloway ............ A01M 31/025 |
| 10,034,473 | B1 | * | 7/2018 | Ellsworth ............... E04H 14/00 |
| 10,617,114 | B1 | * | 4/2020 | Petersen ................ A01M 31/06 |
| 2003/0172574 | A1 | * | 9/2003 | Drummond ........ A01M 31/025 43/1 |
| 2005/0028854 | A1 | * | 2/2005 | Erickson ............... E04H 15/001 135/97 |
| 2005/0055894 | A1 | | 3/2005 | DeVries |
| 2008/0006317 | A1 | * | 1/2008 | Livacich ................ E04H 15/64 135/123 |
| 2008/0066365 | A1 | * | 3/2008 | Dysle .................. A01M 31/025 43/1 |
| 2009/0065039 | A1 | * | 3/2009 | Livacich ............... E04H 15/001 135/123 |
| 2010/0229906 | A1 | * | 9/2010 | Putman ............... A01M 31/025 135/96 |
| 2011/0108078 | A1 | * | 5/2011 | Roman .................. E04H 15/44 135/121 |
| 2011/0168221 | A1 | | 7/2011 | Schlipf |
| 2012/0192906 | A1 | * | 8/2012 | Dankenbring ........ E04H 15/001 135/147 |
| 2013/0146113 | A1 | * | 6/2013 | Hawk, III ........... A01M 31/025 135/143 |
| 2013/0152448 | A1 | * | 6/2013 | Ewert .................. A01M 31/008 43/2 |
| 2013/0180559 | A1 | * | 7/2013 | Dankenbring .......... E04H 15/44 135/98 |
| 2014/0261595 | A1 | * | 9/2014 | Mausen ............... A01M 31/025 135/90 |
| 2015/0368925 | A1 | * | 12/2015 | Livacich ............... E04H 15/001 135/135 |
| 2018/0192636 | A1 | * | 7/2018 | Giese .................... A01M 31/06 |
| 2019/0350191 | A1 | * | 11/2019 | No L ....................... E06B 3/38 |

* cited by examiner

HUNTING BLIND

RELATED APPLICATIONS

The present invention was first described in and claims the benefit of U.S. Provisional Patent Application No. 62/464,087 filed on Feb. 27, 2017, the entire disclosures of which are incorporated herein by reference.

FIELD OF THE INVENTION

The present invention relates generally to the field of layout hunting blinds.

BACKGROUND OF THE INVENTION

A hunting blind, hide or machan is a cover device for hunters, designed to reduce the chance of detection by the hunted game. There are different types of blinds for different situations, such as deer blinds and duck blinds. A decoy is a person, device, or event meant as a distraction, to conceal what an individual or a group might be looking for. Decoys have been used for centuries most notably in game hunting. The other form of a duck decoy, otherwise known as a hunting decoy or wildfowl decoy, is a life-size model of the creature. The hunter may place a number of decoys about the hunting area as they encourage wild birds to land nearby, within the range of the concealed hunter. Originally carved from wood, they are now usually made from plastic. There is a need for a blind that conceals a hunter and provides a mounting area for decoys to be placed while hunting. A suitable solution is desired.

Various attempts have been made to solve problems found in hunting blinds. Among these are found in: U.S. Pat. No. 5,903,997 to James Jacob; U.S. Pat. No. 6,415,807 to Patrick Maher; U.S. Pat. No. 5,787,632 to Robert Kraut. These prior art references are representative of hunting blinds.

None of the above inventions and patents, taken either singly or in combination, is seen to describe the invention as claimed. Thus, a need exists for a reliable hunting blind system, and to avoid the above-mentioned problems.

SUMMARY OF THE INVENTION

To achieve the above and other objectives, the present invention provides for a hunting blind that is erectable out in the field and enables multiple hunters to occupy the same blind and relax in a prone, but ready position for extended periods of time.

It is thus an object of the invention to provide such a hunting blind to include a domed body having a plurality of apertures located on an upper surface thereof, a plurality of support beams, each secured to the domed body along a length thereof, an anchor attached to first ends of each of the plurality of support beams and capable of securing the blind to a ground surface, a stopper located around the anchor, at least one (1) support panel, each attached at an upper end to one (1) of the plurality of support beams and having a support leg located on an outer surface for supporting the support panel at an angle relative to the ground surface, and at least one (1) door, each hingedly attached to the domed body and superjacent to one (1) of the plurality of support panels.

In other embodiments, an object of the invention to provide such a hunting blind system to include a hunting blind, having domed body having a plurality of apertures located on an upper surface thereof, a plurality of support beams, each secured to the domed body along a length thereof, an anchor attached to first ends of each of the plurality of support beams and capable of securing the blind to a ground surface, a stopper located around the anchor, at least one (1) support panel, each attached at an upper end to one (1) of the plurality of support beams and having a support leg located on an outer surface for supporting the support panel at an angle relative to the ground surface, and at least one (1) door, each hingedly attached to the domed body and superjacent to one (1) of the plurality of support panels. A plurality of stakes is provided, each capable of securing the domed body to the ground surface.

In yet other embodiment, an object of the invention to provide such a hunting blind system to include a hunting blind, having domed body having a plurality of apertures located on an upper surface thereof, a plurality of support beams, each secured to the domed body along a length thereof, an anchor attached to first ends of each of the plurality of support beams and capable of securing the blind to a ground surface, a stopper located around the anchor, at least one (1) support panel, each attached at an upper end to one (1) of the plurality of support beams and having a support leg located on an outer surface for supporting the support panel at an angle relative to the ground surface, and at least one (1) door, each hingedly attached to the domed body and superjacent to one (1) of the plurality of support panels. A plurality of stakes is provided, each capable of securing the domed body to the ground surface. Also, at least one (1) decoy is provided, each capable of either being secured to one (1) of the plurality of apertures, or secured to the ground surface through one (1) of the apertures.

It is an object of the present invention to provide a plurality of legs, each affixed adjacent to a terminal end of one (1) of said plurality of support beams.

It is another object of the present invention to provide a flap circumferentially affixed to a perimeter outer diameter of the domed body.

It is yet another object of the present invention to provide a handle located on an inner surface of each of the doors.

It is still another object of the present invention to provide a plurality of mounting brackets, each affixed to an inner surface of the domed body and each capable of securing an individual one (1) of said plurality of support beams thereto.

Yet another aspect of the present invention is to provide where each support beam further comprises a plurality of rod segments, capable of being conjoined.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
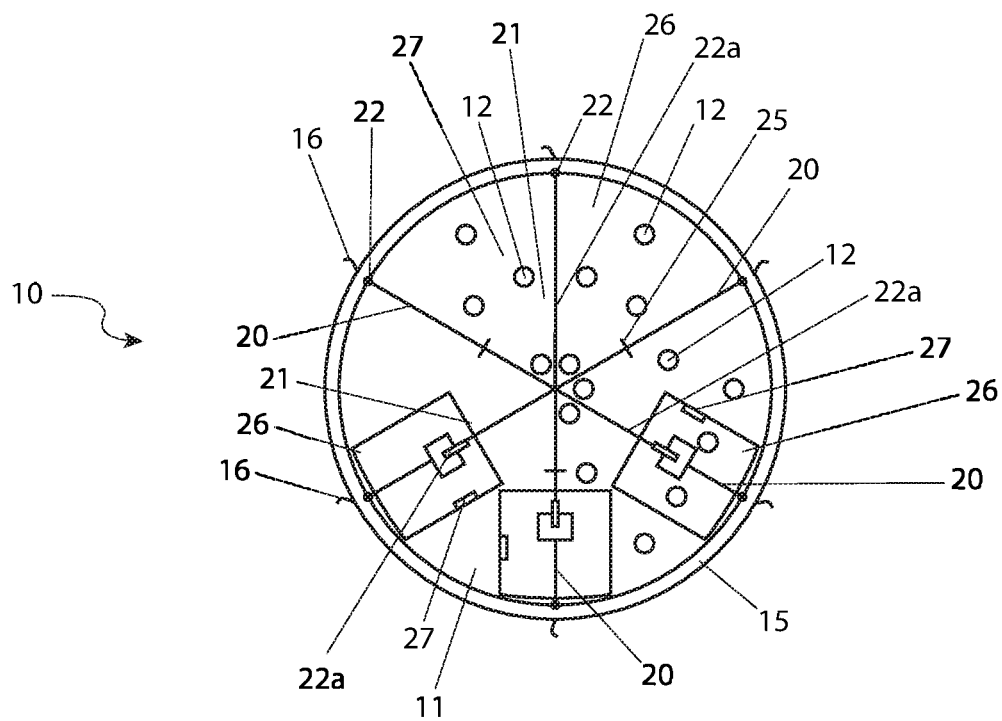
FIG. 1 is a bottom view of a hunting blind 10, according to an embodiment of the present invention.

DESCRIPTIVE KEY 10 hunting blind
11 dome body
12 decoy aperture
13 anchor
14 stopper
15 flap section
16 flap stake
17 sleeve
18a outer body wall
19a inner body wall
20 support beam
21 back support panel
22a first leg
22b second leg
23a first segment
23b second segment
25 mounting bracket
26 door
27 handle
30 first decoy
36 alternate door
40 second decoy
41 second decoy stake

DETAILED DESCRIPTION OF THE PREFERRED EMBODIMENT

The present invention is directed to a hunting blind 10. In one (1) embodiment, the hunting blind 10 may comprise a dome-shaped body 11 having a plurality of decoy apertures 12, the dome body 11 supported by a plurality of support beams 20 and secured to a ground surface with an anchor 13. The hunting blind 10 is particularly suited for concealing a hunter while hunting for waterfowl.

Figure 2:
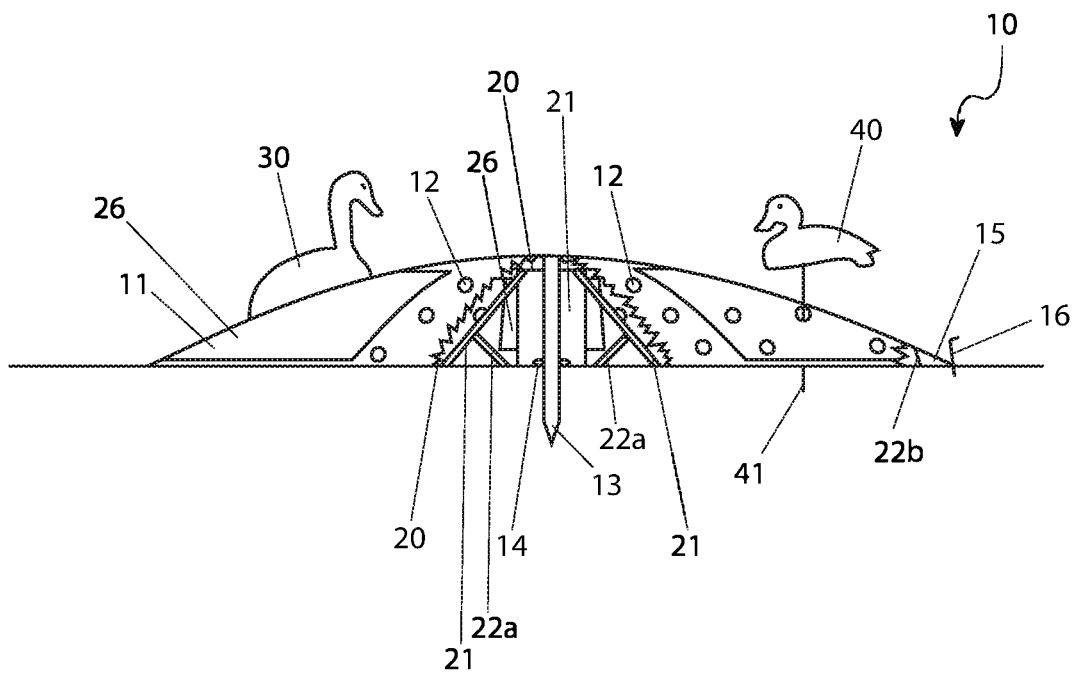
FIG. 2 is a partially cut-away side view illustrating the hunting blind, 10 according to an embodiment of the present invention.
Figure 3:
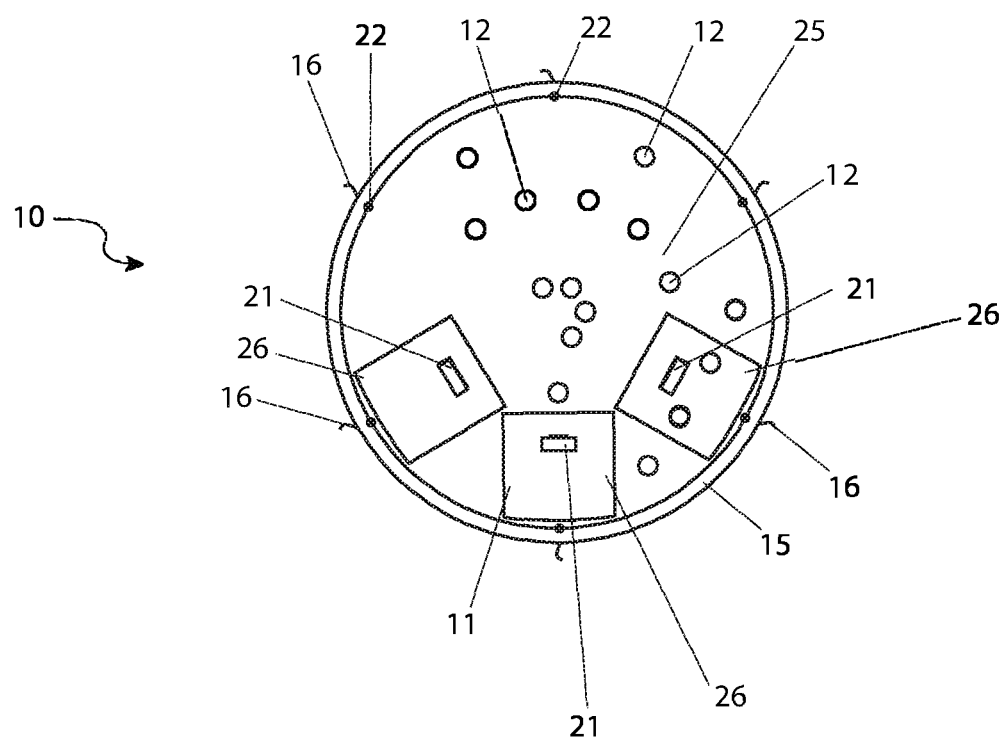
FIG. 3 is a top view of a hunting blind 10, according to an embodiment of the present invention.

Referring now to the drawings, there is shown in FIGS. 1-3 a bottom view, a side cut-away view, and a top view of the hunting blind 10 looking upwards into an interior. The hunting blind 10 may further comprise a dome-shaped body 11 having a generally circular shape and comprising a plurality of decoy apertures 12, each located on the 15 upper surface thereof. The dome body 11 may comprise a single piece of material, having an interior side and an exterior side, or comprises a double-walled structure having an outer body wall 18a and an inner body wall 18b, with an interstitial space therebetween. The decoy apertures 12 are typically arranged in a random pattern, preferably.

Figure 4A:
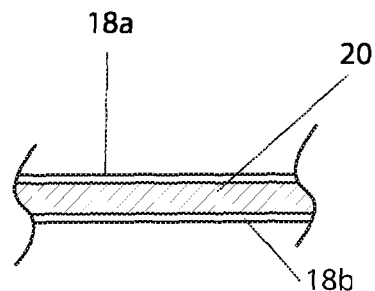
FIG. 4a is a close-up sectional view of a portion of a support beam 20 secured within an outer body wall 18a and an inner body wall 18b of the dome body 11, according to an alternate embodiment of the present invention.
Figure 4B:
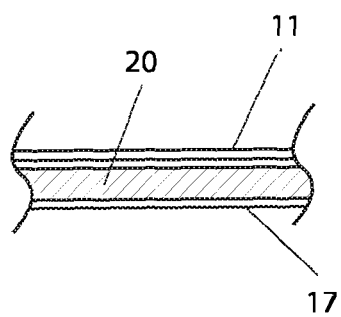
FIG. 4b is a close-up sectional view of a portion of a support beam 20 secured within a sleeve 17 located on an outer surface of the dome body 11, according to an alternate embodiment of the present invention.
Figure 4C:
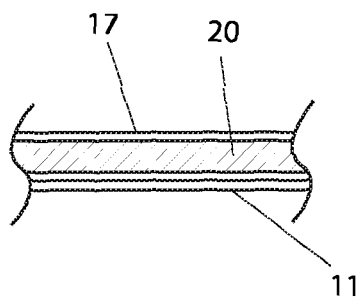
FIG. 4c is a close-up sectional view of a portion of a support beam 20 secured within a sleeve 17 located on an inner surface of the dome body 11, according to an alternate embodiment of the present invention; and, FIG. 5 is a close-up sectional view of a mounting bracket 25, according to an alternate embodiment of the present invention
Figure 5:
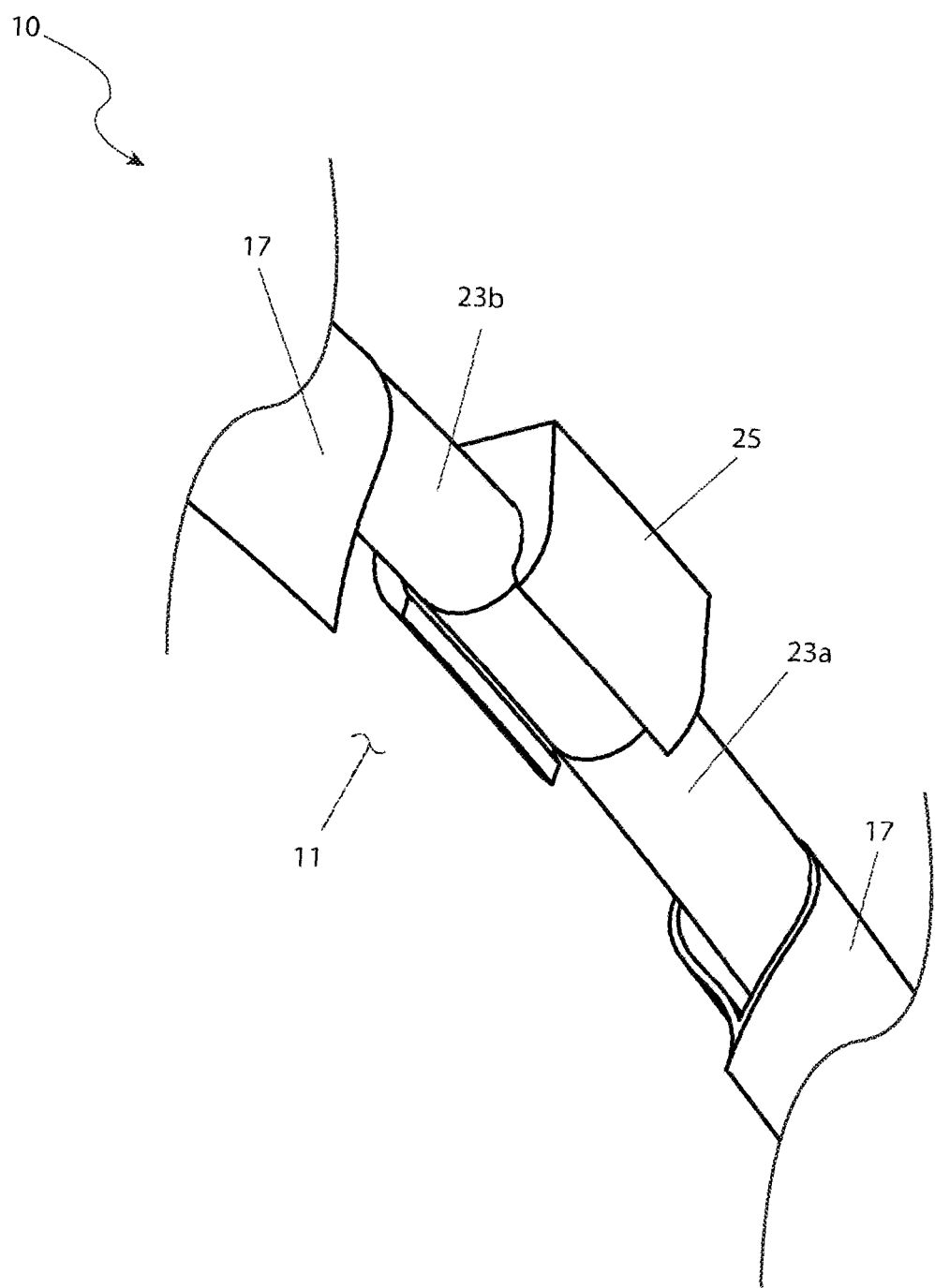

A plurality of support beams 20 are attached at a first end to a distal end of the dome body 11 at the outer perimeter and at a second end to an upper portion of the anchor 13. The anchor 13 along with the support beams 20 may support the dome body 11 above ground and provide a working area for a hunter to lay while hunting. The anchor 13 may have a stopper 14 circumscribing an outer dimeter thereof to arrest further movement of the anchor 13 within the ground surface. The stopper 14 may be disposed on the ground surface. The support beams 20 can be integral to the dome body 11, such as retained within an outer body wall 18a and an inner body wall 18b of the dome body 11, and deployed therewith (see FIG. 4a), or can be removably affixed thereto, such as through a sleeve 17 located either on the interior surface of the dome body 11 (see FIG. 4b) or on the exterior of the dome body 11 (see FIG. 4c). The support beams 20 also can be a monolithic flexible and resilient member, a series of flexible linear rod segments 23a, 23b strung together and capable of being conjoined together to provide an elongated flexible and resilient member, or a plurality of individual linear rod segments 23a, 23b capable of being attached to adjacent ones to create a flexible and resilient member. Further, mounting brackets 25 may exist for each of the support beams 20 to provide an attachment point to the dome body 11. In certain embodiments, particularly where a sleeve 17 is present, these mounting brackets 25 may provide a joint for conjoined individual rod segments of a support beam 20 and provide ease of folding. These mounting brackets 25 can be affixed to the inner surface of the dome body 11. The sleeves 17 would terminate at the location where the mounting brackets 25 reside (see FIG. 5), which illustrates a first segment 23a joined to a second segment 23b, the joint of which resides within an individual mounting bracket 25. The sleeves 17 terminate prior to the mounting bracket 25.

The anchor 13 preferably may comprise a rod with a one inch (1 in.) diameter having a series of stopping points to prevent a user from inserting the center support beyond three feet (3 ft.). As shown in FIG. 1, the plurality of decoy apertures 12 may allow a hunter/sportsman to place either a first decoy 30 in the general configuration or silhouette of a waterfowl, or a stake 41 of a second decoy 40 therethrough to anchor within the ground surface. The hunting blind 10 may preferably conceal up to three (3) hunters from game animals to enable the hunters to come within sufficient proximity of the game animals to target the game animals.

Additional means of securement or support for the hunting blind 10 can include a plurality of second legs 22b, each attached adjacent to or at the terminal second end of an individual support beam 20, which, when deployed, is capable of contacting the ground surface. Also, the perimeter outer diameter of the dome body 11 can be capable of enabling flap stakes 16 to be routed therethrough for securement within the ground. Apertures with or without grommets (not shown) can be used to accomplish this task.

Up to three (3) back support panels 21 are affixed at an upper end to an individual support beam 20 and can be deployed therewith. The back support panels 21 are generally planar and are sized to contact the ground when deployed in a generally angled configuration, such as a forty-five degree (45°) angle from vertical. Each back support panel 21 has a first leg 22a depending downward therefrom a first side to support the back support 21 at the given angle. It is preferred that the first side faces the center of the hunting blind 10 such that the hunter can rest their back against it when in a sitting position during elongated periods of time concealed within the hunting blind 10. Once fully deployed, each of the back support panels 21 is at an angle that allows a hunter to comfortably rest their back against and possibly open fire from the same position, such as a lawn chair or similar seating assembly. The preferred material of the back support panel 21 includes a comfortable foam outer layer and a cushioned rest at the bottom that contacts the ground surface to provide comfort for a hunter resting against the back support panel 21 for elevated periods of time, commonly associated with hunting.

Also depicted is a plurality of doors 26, each hingedly attached to the dome body 11 such that the door 26 swings open downward into the interior of the hunting blind 10. A handle 27 is affixed to the inner surface of the door 26 to enable the hunter to grasp and motion the door 26 downward when exiting or preparing to target the game. Certain embodiments provide for the doors 26 to have a spring hinge to bias the door 26 in a closed position. In such an embodiment, the door 26 can incorporate a securing mechanism (not shown), such as a magnetic or latched connection to maintain the door 26 closed, which can be opened by the hunter when desired.

The location of each of the doors 26 is immediately superjacent to an individual back support panel 21. In a preferred embodiment, there are three (3) back support panels 21 and three (3) doors 26. Each of the panel 21/door 26 pairs is located on the same side of the hunting blind 10 such that the doors 26 can be opened and the hunter can open fire such that each line of fire is directed away from any other line of fire or the interior of the hunting blind 10.

The hunting blind 10 may attract waterfowl by resembling a hill to which geese may be feeding on. In order to incorporate such a shape, a flap section 15 can be attached to or affixed to the perimeter edge of the outer diameter of the dome body 11. The flap stakes 16 previously mentioned can be routed through the flap section 15.

The hunting blind 10 may comprise a diameter of approximately eighteen feet (18 ft.) and a height of approximately three feet (3 ft.) in the center and tapering off to meet the ground along the outer edge. The hunting blind 10 comprises waterproof and weatherproof material to withstand rain and other inclement weather. The hunting blind 10 may be provided in a portable and lightweight configuration. During non-use, the hunting blind 10 may be folded and stored in a bag or other similar carrying vessel. The hunting blind 10 encourages wild birds to land nearby, within the range of the concealed hunters. The exact specifications, materials used, and method of use of the hunting blind 10 may vary upon manufacturing.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A hunting blind system, consisting of:
   a domed body having a plurality of apertures directly located on an upper surface thereof;
   a plurality of support beams each secured to said domed body along a length thereof;
   an anchor attached to a first end of each of said support beams and securing said blind to a ground surface;
   a stopper located around said anchor;
   at least one support panel each attached at an upper end of one of said support beams and having a support leg located on an outer surface of said at least one support panel for supporting said at least one support panel at an angle relative to said ground surface;
   at least one door each hingedly attached to said domed body and superjacent to one of said at least one support panel;
   a plurality of stakes each securing said domed body to said ground surface;
   at least one decoy each secured to one of said apertures or secured to said ground surface through one of said apertures;
   a plurality of legs each affixed adjacent to a terminal end of one of said support beams;
   a handle located on an inner surface of each of said at least one door;
   a plurality of mounting brackets each affixed to an inner surface of said domed body and each securing an individual one of said support beams thereto; and
   a flap circumferentially affixed to a perimeter outer diameter of said domed body;
   wherein each of said support beams further comprises a plurality of conjoined rod segments; and
   wherein said anchor includes the stopper circumscribing an outer dimeter thereof to arrest further movement of said anchor within said ground surface.

* * * * *